United States Patent
Martin et al.

(10) Patent No.: US 6,553,368 B2
(45) Date of Patent: *Apr. 22, 2003

(54) NETWORK DIRECTORY ACCESS MECHANISM

(75) Inventors: Jean-Christophe Martin, Varces (FR); Sylvain Duloutre, Fontaine (FR)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,870

(22) Filed: Mar. 3, 1998

(65) Prior Publication Data

US 2001/0011277 A1 Aug. 2, 2001

(51) Int. Cl.⁷ .............................................. G06F 17/30
(52) U.S. Cl. .................. 707/3; 707/1; 707/10; 707/9; 709/217; 709/218; 709/219
(58) Field of Search .................. 707/103, 10, 104, 707/1, 2, 4, 9; 709/217, 218, 219; 713/200, 201, 222

(56) References Cited

U.S. PATENT DOCUMENTS

| | | | | |
|---|---|---|---|---|
| 5,491,817 A | * | 2/1996 | Gopal et al. | 395/600 |
| 5,497,422 A | * | 3/1996 | Tysen et al. | 709/217 |
| 5,500,929 A | * | 3/1996 | Dickinson | 395/160 |
| 5,649,103 A | * | 7/1997 | Datta et al. | 709/203 |
| 5,706,517 A | * | 1/1998 | Dickinson | 395/683 |
| 5,758,343 A | * | 5/1998 | Vigil et al. | 707/10 |
| 5,774,552 A | * | 6/1998 | Grimmer | 380/25 |
| 5,812,533 A | * | 9/1998 | Cox et al. | 370/259 |
| 5,862,325 A | * | 1/1999 | Reed et al. | 395/200.31 |
| 5,864,683 A | * | 1/1999 | Boebert et al. | 709/218 |
| 5,878,415 A | * | 3/1999 | Olds | 707/9 |

(List continued on next page.)

OTHER PUBLICATIONS

Hui et al, "A dynamic IP addressing system for Internet telephony applications", computer communication, pp. 1–21, Jan. 1998.*

Mansfield, "Charting networks in the X.500 directory", network working group, pp. 1–11, Mar. 1994.*

Bruno, "Finding Some Directory Assistance," Data Communications, vol. 27, No. 1, Jan. 1998, p. 72.

Bruno, "Tie it all Together," Data Communications, vol. 26, No. 3, Mar. 1997, pp. 75, 77, 80, 83.

ISO/IEC 9594–2: "Information technology—Open Systems Interconnection—The Directory: Models," ITU–T Recommendation X.501, 1993, 4 (2–sided) pages.

Data Connection Limited: "DC MetaLink Product Overview," Aug. 1998, 4 (2–sided) pages.

*Primary Examiner*—Jean M. Corrielus
(74) *Attorney, Agent, or Firm*—Meyertons, Hood, Kivlin, Kowert, & Goetzel, P.C.; B. Noël Kivlin

(57) ABSTRACT

A computer-implemented directory access mechanism provides a directory service operable to access a network directory under a predetermined protocol by responding to an access request under the protocol for information available in a predetermined environment external to the directory. The directory service then uses the access method for the environment to access the information available in the environment. In this manner, data in the given environment can be accessed by a directory service operable under the given protocol by configuring an attribute access method and using this method to retrieve the information. The protocol can be the Lightweight Directory Access Protocol. The information to be accessed could typically be an attribute of an entry in the directory. An access control list (for example the Directory Access Control Domain) can contain not only control access rights for directory objects, but also the access methods for attributes of the directory objects.

12 Claims, 4 Drawing Sheets

U.S. PATENT DOCUMENTS

| | | | | |
|---|---|---|---|---|
| 5,884,035 | A | * | 3/1999 | Butman et al. ........ 395/200.48 |
| 5,922,074 | A | * | 7/1999 | Richard et al. ............. 713/200 |
| 5,995,961 | A | * | 11/1999 | Levy et al. .................... 707/4 |
| 6,192,362 | B1 | * | 2/2001 | Schneck et al. .............. 707/10 |
| 6,208,986 | B1 | * | 3/2001 | Schneck et al. ................ 707/3 |
| 6,260,039 | B1 | * | 7/2001 | Schneck et al. .............. 707/10 |

* cited by examiner

NETWORK DIRECTORY ACCESS MECHANISM

BACKGROUND OF THE INVENTION

This invention relates to a network directory access mechanism, for example access mechanisms based on Directory Access Control Domains (DACDs) on the Internet.

The popularity of directory servers based on ISO/CCITT X.500 model has increased with the wide support by the industry of the Lightweight Directory Access Protocol (LDAP). LDAP is defined by RFC 1777. There is a desire to try to integrate heterogeneous information in these directories by either moving the data from their old format to this new model, or to map the old model into the X.500 model. However, this is not straightforward and has practical difficulties.

The directory services under the X.500 model are based on an object hierarchy, with each node in the hierarchy corresponding to a given level of detail. A particular location in the hierarchy is identified by the sequence of nodes down the hierarchy from the root or base node to the node in question. Each entry in the hierarchy sets out attributes for the entry. Although there is a single logical hierarchy, parts of the hierarchy can be physically separated. In order for the practical hierarchy to operate, therefore, each node identifies the physical location of the adjacent nodes down the hierarchy.

To access the hierarchy, access control lists are provided. These can be provided at nodes throughout the hierarchy and define access control rights for different users and/or bodies. The access control rights relate to areas of the local structure (domains) of the hierarchy and not to the physical locations of the nodes of the attributes for the hierarchy. Thus, if it is intended to provide access under the LDAP, for example, to information created under a pre-existing, non-X.500 format, it is necessary to copy the whole of the previous directory to the new directory accessed through LDAP.

The present invention seeks to provide a solution to the problem of how to integrate into a directory service operable under a first format directory entries under a second format, without needing to convert all of the entries under the first format into the second format.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a computer-implemented directory access mechanism. The method comprises steps of:

i) a directory service operable to access a network directory under a predetermined protocol responding to an access request under the protocol for information available in a predetermined environment external to the directory; and ii) the directory service using an access method for the environment to access the information.

Thus, an embodiment of the invention enables a directory service operable under a predetermined directory access protocol to access data in a predetermined environment (e.g. data stored in accordance with a different storage model from that on which the predetermined protocol is based, or a different physical location, or a different protocol) by configuring an attribute access method and using this method to retrieve the information from, for example, a directory operable in the predetermined environment.

In a preferred embodiment of the invention the access method configuration is achieved by extending a domain definition normally used for access control. Where reference is made to an access method, this forms an access process or procedure, typically implemented by a set of access parameters or computer instructions or a combination thereof. Preferably, the access method is retrieved via a domain definition for a domain of the directory. The domain definition can also include access control information. In a preferred embodiment of the invention, the directory is defined under X.500 and the access method is retrieved from a Directory Access Control Domain object.

However, the invention is not limited to associating the access method with access control. Thus it is possible for an access method to be defined without access control, on a specific attribute.

The domain definition can include a pointer to an access method for the domain in the environment, possibly stored externally to the directory or possibly stored with a definition of a node in the directory.

In the preferred embodiment of the invention, the protocol is the Lightweight Directory Access Protocol. The information to be accessed could typically be an attribute of an entry in the directory.

Thus, a preferred embodiment of the invention uses the Directory Access Control Domain (DACD) as defined in the ISO/CCITT X.501 (1993 E) specification not only to store access rights but also to store access methods. The access method points to a directory entry storing the specific access method parameters.

In accordance with another aspect of the invention, there is provided a directory access mechanism comprising a directory service to access a network directory operable under a predetermined protocol, at least one identifier of an access method for access to information in a predetermined environment external to the directory, the directory service being configured to respond to an access request under the protocol to access the information in said environment using an access method identifier.

In accordance with a further aspect of the invention, there is provided a directory access mechanism comprising a directory service configured to be operable to access to a network directory under a predetermined protocol and to identify at least one access method for access to information in a predetermined environment external to the directory, the directory service being configured to respond to an access request under the protocol to access the information available in the environment using an access method identifier.

In accordance with yet a further aspect of the invention, there is provided an Access Control List (ACL) for a network directory service, which access control list comprises control access rights for directory objects and access methods for attributes of the directory objects. The access control list can form a computer implemented access control mechanism for an object-based directory.

The invention also provides a computer program product on a carrier medium, the computer program product comprising a directory service configured to be operable to provide directory access under a predetermined protocol, and at least one identifier of an access method for information in a predetermined environment external to the directory, the directory service being configured to respond to an access request under the protocol to access the information available in the environment using an access method identifier.

The invention further provides a directory server for a computer network, the directory server comprising storage for a network services directory under a predetermined protocol and at least one identifier of an access method for information in a predetermined environment external to the directory, and a processor for executing a directory service controller, the directory service being configured to respond to an access request under the predetermined protocol to access the information available in the environment using an access method identifier.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
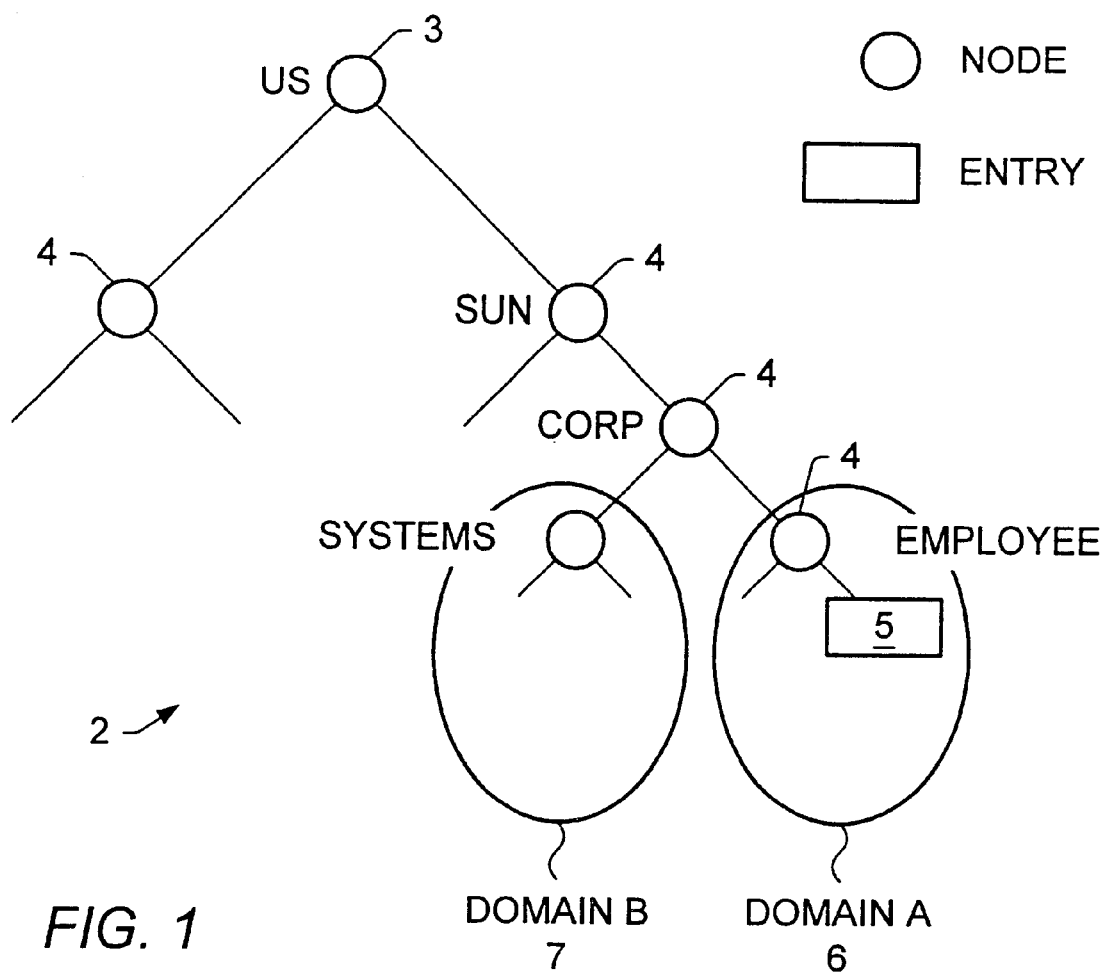
FIG. 1 is a schematic representation of a directory structure for a network directory service.

FIG. 1 is a schematic representation of a conventional directory information structure arranged as an object hierarchy. The directory information structure enables information on network users and resources to be stored.

The directory structure comprises, for example, a tree-shaped hierarchy 2 of nodes 3, 4 etc leading from a root node 3 to a plurality of entries 5 forming the leaves of the hierarchy. Within the hierarchy, there are defined domains, for example domain A 5 and domain B 6.

Associated with a domain, there is defined an Access Control List (ACL). The ACLs define access control rights for different users and/or bodies. The ACL for a given domain is associated with the highest node within the domain and defines the access control rights for the domain. The ACL has the required granularity, but not the semantic of the access method. For example, it could not be possible to define that entries such as telephone numbers are stored in one database and entries e-mail addresses are stored in another database. As a result, integration of non-X.500 based attribute data is not possible according to the conventional model without copying all of the original information into the entries concerned. For example, if e-mail addresses for the entries 5 in domain A were stored in a different database, it would be necessary to make a complete copy of that information into the database for the entries 5.

Figure 2:
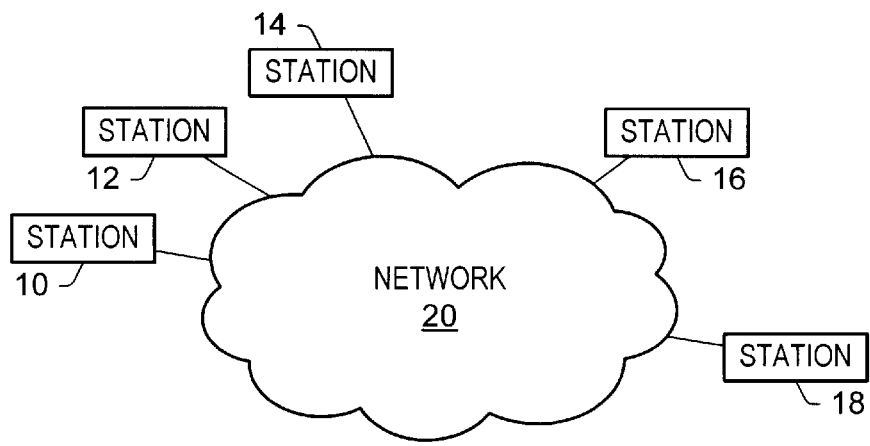
FIG. 2 is a schematic representation of a telecommunications environment including a plurality of stations interconnected via a network.

FIG. 2 of the accompanying drawings is a schematic representation of an instance of a computer network where a five stations 10, 12, 14, 16 and 18 communicate via a network 20. The network could be a local area network (LAN), wide area network (WAN), or an intra- or Inter-network. Each of the stations could be formed by a single computer or by a network of computers, for example a LAN or WAN. Also, although only five stations are shown, it will be appreciated that a typical computer network includes many more stations arranged in a complex interconnection structure. The interconnection structure could be at one logical level, or could employ at least in part a hierarchical structure. The individual stations can make variable demands on the system, both relative to each other and over time. In a typical situation, a relatively smaller number of the stations will form server stations and a relatively larger number of the stations will form client stations. In FIG. 2, stations 10 and 18 are assumed to support a directory service master 14 and a directory service slave 20, respectively and that stations 12, 14 and 16 support appliances including a Directory User Agent (DUA) 28.

Particular embodiments of the invention will now be described which are based on the LDAP protocol in the context of an Internet application. However, it will be appreciated that the invention is not limited thereto, and that the invention finds application to any communications network application where it is desired to integrate directories operable under different protocols.

In a specific embodiment of the invention, the Directory Access Control Domain (DACD) as defined in the ISO/CCITT X.501 (1993 E) specification is used, not only to store access rights but also to store access methods. The access method can point to a directory entry storing specific database access method parameters, whereby it is possible to leave the non-X.500 data in its original location, and still be able to access the information using LDAP.

Figure 3:
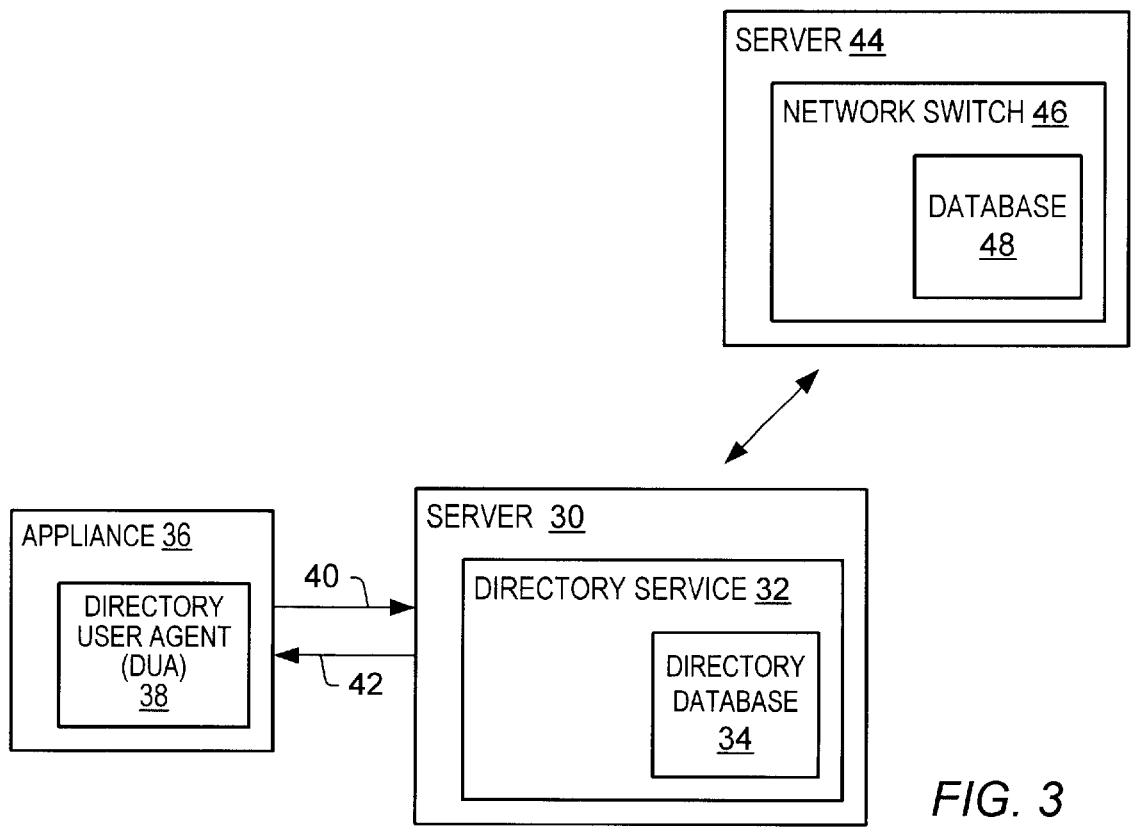
FIG. 3 is a schematic representation of a client server station.

FIG. 3 is a schematic block representation of an embodiment of the invention. In FIG. 3, a directory service 32 includes a directory database 34 located on a server 30. The database 34 contains an X.500 directory database.

A Directory User Agent (DUA) 38 for an appliance 36 forms a directory user client for accessing the directory service 32 to read information from or to write information to the directory 34. It will be appreciated that there will typically be a large number of appliances and DUAs 38 requiring and making access to the directory service 32. Only one appliance 36 and DUA 38 are shown in FIG. 3, however, for illustrative purposes and ease of explanation.

Access by the DUA 38 to the directory service 32 is by way of request 40 and response 42 messages under a conventional protocol, here LDAP. Thus, the client 38 will solicit one or more response messages 42 by issuing a request 40 to the directory service 32. The request message 40 may be a request for information about, for example, an attribute of a network user or a network resource (for example an Internet protocol (IP) address for the user or resource). The server 30 will then return one or more response messages 42 to the request 40. The request and response messages will be linked to each other by the use of related message identifiers in the messages, typically in headers for the messages.

Also shown in FIG. 3 is a further database 48, on a further server 44. The further database 48 may form part of another directory service operable under another protocol, or may simply be a database containing information relevant to the database on the directory server 30 but in a non-compatible format. In the present example it is assumed that the further database 48 is a switch database for a public switched telephone network switch 46. The switch database 48 contains telephone number information, at least some of which numbers relate to entries in the directory database 34.

In an embodiment of the invention, the directory service 32 at the server 30 comprises a DACD mechanism which defines not only access rights for domains but also access methods. The DACD mechanism can be constructed in accordance with ISO/CCITT X.501 (1993 E) except that it stores not only information relating to access control rights (i.e. who can access what) but also information about access control methods (i.e. how to access what). In a preferred form of the invention, the access control methods in the DACD mechanism comprises pointers to directory entries containing specific database access parameters. In this manner, integration of non-X.500 database attributes is possible without having to copy all of the database attributes to an X.500 format.

Figure 4:
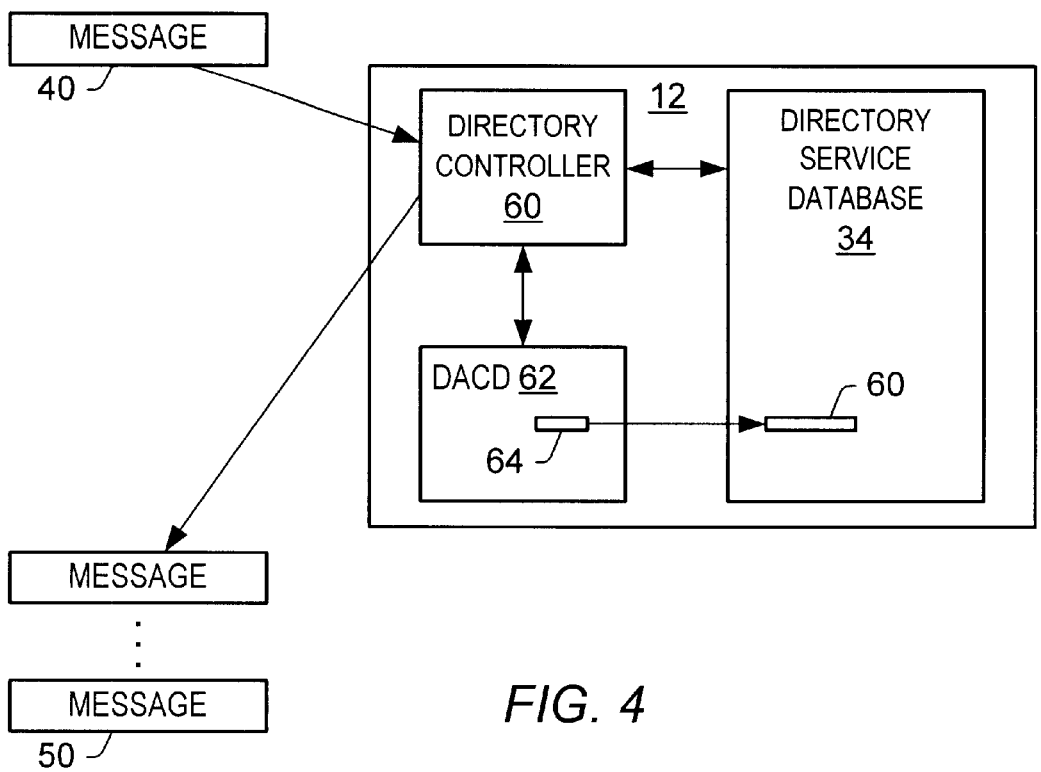
FIG. 4 is a schematic representation of a directory server.

FIG. 4 is a schematic representation of aspects of a directory service master 32 of an embodiment of the invention relevant to an understanding of the invention. The directory service includes the directory service database 34 and a directory controller 60. The directory controller 60 is responsive to a request message 40 from a DUA 38 to perform the operations necessary with respect to the database 34 and to return one or more response messages 42 to the user.

Figure 5:
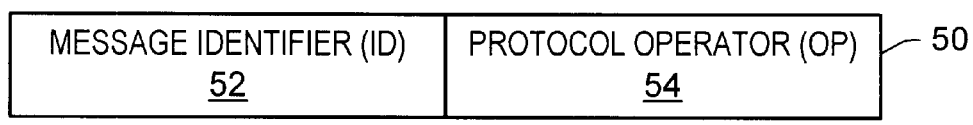
FIG. 5 is a schematic representation of a message format for a directory access protocol.

FIG. 5 contains a schematic representation of an LDAP message format (LDAP message) 50 which provides an envelope containing common fields required in all protocol exchanges. The LDAP message provides a sequence with a message identifier (message ID) 52 followed by a protocol operator (protocol OP) 54. The message ID has a unique value compared to that of all other outstanding requests in an LDAP session. The message ID is echoed in all responses corresponding to a request in which the message ID was initially used.

The protocol operation specified by an LDAP message can conventionally be selected from the following types:

bindRequest—initiates a protocol session between a client and a server and sets out the parameters for the session;
bindResponse—returns an indication of the status of the client's request for initiation of a session;
unbindRequest—terminates a session and has no response defined;
searchRequest—enables a client to initiate a search and defines: the base object in the directory with respect to which the search is to be performed; the scope of the search to be performed; an indication of how aliases are to be handled; a maximum search result size to be returned; a time limit for the search; indication of which attributes are to be returned and whether attribute types and/or values are to be returned; and a filter defining match characteristics;
searchResponse—returns the response to a search request, wherein a sequence of responses will typically be necessary in order to return the full response to the request from the client;
modifyRequest—enables a client to request modification of an object in the directory;
modifyResponse—returns the result of the modification request;
addRequest—enables a client to request addition of an object to the directory;
addResponse—returns the result of the addition request;
delRequest—enables a client to request deletion of an object to the directory;
delResponse—returns the result of the deletion request;
modifyRDNRequest—enables a client to request modification of the last component (Relative Distinguished Name) of the name of an entry in the directory;
modifyRDNResponse—returns the result of the RDN modification request;
compareDNRequest—enables a client to compare an attribute value with an entry in the directory;
compareDNResponse—returns the result of the comparison request;
abandonRequest—enables abandonment of a request.

Thus the directory controller 60 is arranged to perform the operations necessary to be able to return the appropriate responses to the different requests identified above.

In responding to an access request, the directory controller 60 is responsive to a DACD 62 to identify a pointer 64 to a directory entry 66 containing database access control parameters for a database in the requested attributes are stored.

Thus, it is possible, for example, to specify that telephone number attributes are to be retrieved from the telecom switch equipment at the switch 46 directly through the access method appropriate for the switch (e.g., by direct access to the switch database 48, or by use of a proprietary protocol) without any copy of the telephone number needing to be kept in the directory 34. Thus, when a read request for the telephone number of an entry in the database 34 is received by the directory server 32 under LDAP, the telephone number attributes are not read from the directory database 34, but instead are read from the switch database 48 using the specific access method.

Figure 6:
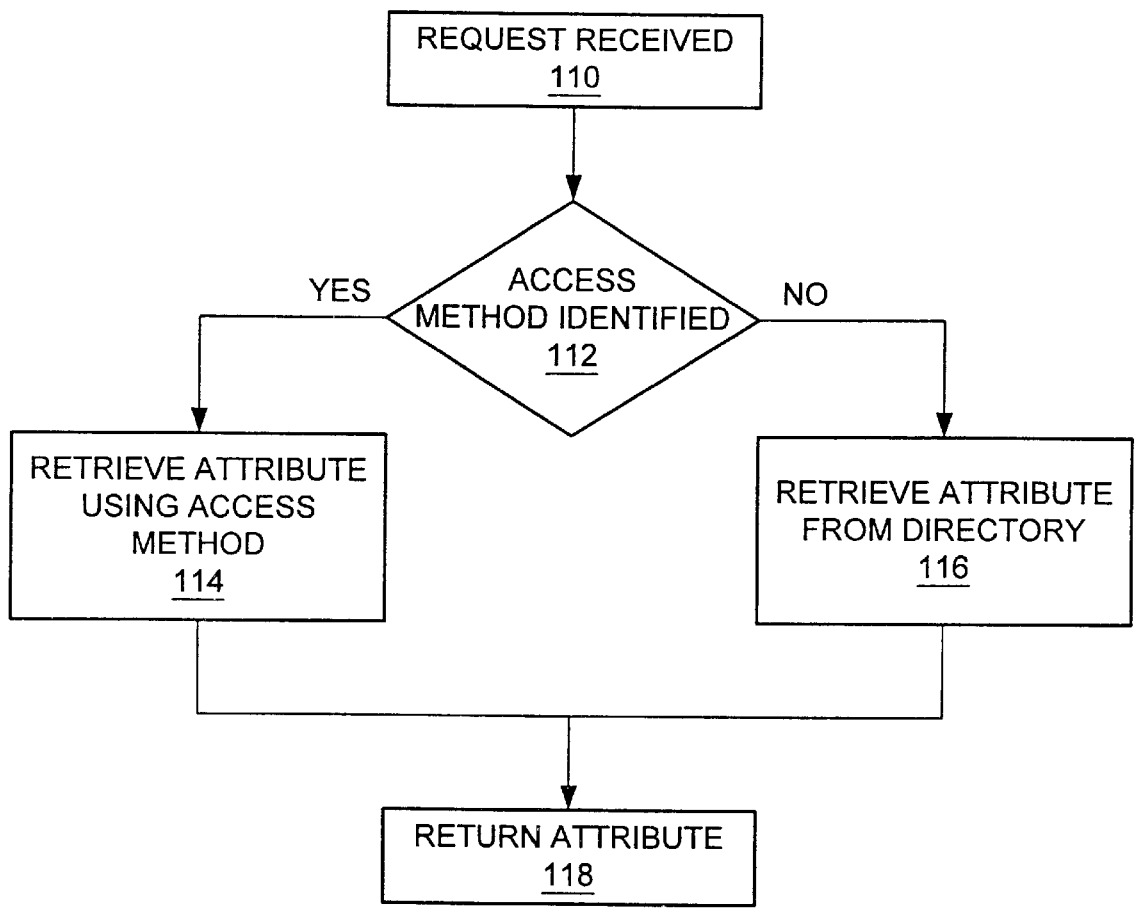
FIG. 6 is a flow diagram of the operation of a directory controller.

FIG. 6 is a schematic flow diagram illustrating the operation of the directory service controller 60.

In step 110 a request is received from a DUA 38. The request can be, for example, a request to search for an attribute (e.g. a phone number) of a given distinguished name (DN), e.g.:

Search DN=<ANY DN> phone number

Here the distinguished name relates to an entry in the directory hierarchy, <ANY DN> relates to an appropriate key along the directory hierarchy chain and 'phone number' relates to the attribute being searched.

In step 112, the directory service controller 44 looks at the DACD for the appropriate domain in which the distinguished name is found to determine if an access method is identified for the attribute concerned.

If no access method is identified, then, in step 114, the directory controller accesses the requested access method from the directory database 14.

If an access method is found, then, in step 116, the directory controller retrieves the requested attribute using the access method concerned (for example by the issue of an appropriate GET message) and waiting for the response message.

The access methods could be defined statically or dynamically at each node in the directory 34.

Following step 114 or step 116, the accessed attribute is returned in step 118.

Although the present invention has been described specifically in the context of LDAP-based directory servers to permit the integration of non-X.500 data by employing ACLs to not only control access rights but also to define access methods, it will be appreciated that the invention can also be applied to other directory storage protocols. Indeed, the invention more generally provides the use of access control lists to define not only control access rights, but also to control access methods.

More generally, an embodiment of the invention can provide access to data in a predetermined environment (e.g. data stored in accordance with a different storage model from that on which the predetermined protocol is based, or a different physical location, or a different protocol) by configuring an attribute access method and using this method to retrieve the information from, for example a directory operable in the predetermined environment.

Also, although the storage of the ACL information has been described as being in the directory server, storage external to the directory server (e.g., in flat files) could also be employed. Further, the storage of the ACL information could be in the entry at the top of the subtree defined by the DACD, or indeed in all the entries in the DACD. Indeed, the location of the storage of the ACL information could be chosen according to a particular implementation or application.

Accordingly, it will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly set out in the claims may be made with features of other dependent claims and/or independent claims, as appropriate, within the spirit and scope of the present invention.

What is claimed is:

1. A computer-implemented directory access mechanism to integrate information stored in heterogeneous environments, comprising:
   i) a directory service comprising a directory database operable to receive a first request in a first protocol to access information stored in an environment external to the directory database;
   ii) said directory service retrieving an access method usable to access the information, wherein the access method specifies a second protocol different than the first protocol; and
   iii) said directory service creating a second request to access the information according to the second protocol;
   wherein said directory service receiving the first request in the first protocol comprises the directory service receiving the first request in an LDALP protocol;
   wherein the second protocol specified by the access method comprises a protocol other than an LDAP protocol; and
   wherein said directory service creating the second request to access the information according to the second protocol comprises the directory service creating the second request to access the information according to the protocol other than an LDAP protocol.

2. The mechanism of claim 1,
   wherein the access method is retrieved from a domain definition for the directory service.

3. The mechanism of claim 2,
   wherein the domain definition is constructed in accordance with an X.501 specification, except that the domain definition also includes information relating to one or more access methods usable to access information stored in one or more environments external to the directory service.

4. The mechanism of claim 2,
   wherein the domain definition also includes access control information.

5. The mechanism of claim 1, wherein the directory service complies with the X.500 specification and the access method is retrieved from a Directory Access Control Domain object.

6. A method for integrating information stored in association with multiple directory services, the method comprising:
   a first directory service including a first directory database receiving a first request in a first protocol to access information stored in a second directory database of a second directory service;
   the first directory service retrieving an access method, wherein the access method specifies a second protocol different than the first protocol, wherein the second protocol is usable to retrieve the information from the second directory service;
   the first directory service creating a second request according to the second protocol; and
   the first directory service sending the second request to the second directory service to retrieve the information from the second directory database;
   wherein said first directory service receiving the first request in the first protocol comprises the first directory service receiving the first request in an LDAP protocol;
   wherein the second protocol specified by the access method comprises a protocol other than an LDAP protocol; and
   wherein said first directory service creating the second request according to the second protocol comprises the first directory service creating the second request according to the protocol other than an LDAP protocol.

7. A method for retrieving information, the method comprising:
   a directory service including a directory database receiving a first request in a first protocol to access information stored in association with a second database external to the directory database;
   the directory service retrieving an access method specifying a second protocol usable to retrieve the information from the second database;
   the directory service creating a second request according to the second protocol; and
   the directory service sending the second request to the second database to retrieve the information from the second database;
   wherein said directory service receiving the first request in the first protocol comprises the directory service receiving the first request in an LDAP protocol;
   wherein the second protocol specified by the access method comprises a protocol other than an LDAP protocol; and
   wherein said directory service creating the second request according to the second protocol comprises the directory service creating the second request according to the protocol other than an LDAP protocol.

8. A computer program product on a carrier medium, said computer program product comprising:
   i) a directory service comprising a directory database operable to receive a first request in a first protocol to access information stored in an environment external to the directory database;
   ii) said directory service retrieving an access method usable to access the information, wherein the access method specifies a second protocol different than the first protocol; and
   iii) said directory service creating a second request to access the information according to the second protocol;
   wherein said directory service receiving the first request in the first protocol comprises the directory service receiving the first request in an LDAP protocol;
   wherein the second protocol specified by the access method comprises a protocol other than an LDAP protocol; and wherein said directory service creating the second request to access the information according to the second protocol comprises the directory service creating the second request to access the information according to the protocol other than an LDAP protocol.

9. A computer-implemented directory access mechanism to integrate information stored in heterogeneous environments, comprising:
   i) a directory service comprising a directory database operable to receive a first request in a first protocol to access information stored in an environment external to the directory database;
   ii) said directory service retrieving an access method usable to access the information, wherein the access method specifies a second protocol different than the first protocol; and
   iii) said directory service creating a second request to access the information according to the second protocol;
   wherein the directory service is a first directory service;
   wherein the directory database is a first directory database;
   wherein the information is stored in a second directory database of a second directory service;
   wherein the first directory service receives the first request in a first directory access protocol;
   wherein the access method specifies a second directory access protocol usable to access the second directory service; and
   wherein the first directory service creates the second request to access the information according to the second directory access protocol.

10. A computer-implemented directory access mechanism to integrate information stored in heterogeneous environments, comprising:
    i) a directory service comprising a directory database operable to receive a first request in a first protocol to access information stored in an environment external to the directory database;
    ii) said directory service retrieving an access method usable to access the information, wherein the access method specifies a second protocol different than the first protocol; and
    iii) said directory service creating a second request to access the information according to the second protocol;
    wherein the directory database is a first database;
    wherein the information is stored in a second database external to the first database;
    wherein the access method specifies a database protocol usable to access the second database; and
    wherein the first directory service creates the second request to access the information according to the database protocol.

11. A computer program product on a carrier medium, said computer program product comprising:
    i) a directory service comprising a directory database operable to receive a first request in a first protocol to access information stored in an environment external to the directory database;
    ii) said directory service retrieving an access method usable to access the information, wherein the access method specifies a second protocol different than the first protocol; and
    iii) said directory service creating a second request to access the information according to the second protocol;
    wherein the directory service is a first directory service;
    wherein the directory database is a first directory database;
    wherein the information is stored in a second directory database of a second directory service;
    wherein the first directory service receives the first request in a first directory access protocol;
    wherein the access method specifies a second directory access protocol usable to access the second directory service; and
    wherein the first directory service creates the second request to access the information according to the second directory access protocol.

12. A computer program product on a carrier medium, said computer program product comprising:
    i) a directory service comprising a directory database operable to receive a first request in a first protocol to access information stored in an environment external to the directory database;
    ii) said directory service retrieving an access method usable to access the information, wherein the access method specifies a second protocol different than the first protocol; and
    iii) said directory service creating a second request to access the information according to the second protocol;
    wherein the directory database is a first database;
    wherein the information is stored in a second database external to the first database;
    wherein the access method specifies a database protocol usable to access the second database; and
    wherein the first directory service creates the second request to access the information according to the database protocol.

* * * * *